United States Patent [19]

Flammang

[11] Patent Number: 5,694,674
[45] Date of Patent: Dec. 9, 1997

[54] METHOD FOR MAKING A COOKING VESSEL

[75] Inventor: Denis Flammang, Rumilly, France

[73] Assignee: SEB S.A., Selongey, France

[21] Appl. No.: 514,744

[22] Filed: Aug. 14, 1995

Related U.S. Application Data

[62] Division of Ser. No. 389,803, Feb. 16, 1995, Pat. No. 5,506,062, which is a continuation of Ser. No. 73,657, Jun. 8, 1993, abandoned, which is a continuation of Ser. No. 855,887, Mar. 23, 1992, abandoned.

[30] Foreign Application Priority Data

| Mar. 27, 1991 | [FR] | France | 91 03695 |
| Jul. 26, 1991 | [FR] | France | 91 09500 |
| Jan. 10, 1992 | [FR] | France | 92 00221 |

[51] Int. Cl.⁶ .................................................. B23P 19/04
[52] U.S. Cl. .................... 29/460; 29/505; 29/527.4; 220/912
[58] Field of Search .............. 220/912; 29/460, 29/505, 521, 527.2, 527.4

[56] References Cited

U.S. PATENT DOCUMENTS

| 1,280,908 | 10/1918 | Wales et al. |
| 1,730,034 | 10/1929 | Faulk . |
| 3,017,492 | 1/1962 | Jepson . |
| 3,399,332 | 8/1968 | Savolainen . |
| 3,406,446 | 10/1968 | Muldovan . |
| 3,788,513 | 1/1974 | Racz . |
| 4,283,464 | 8/1981 | Hascoe . |
| 4,350,259 | 9/1982 | Cartossi . |
| 4,427,993 | 1/1984 | Fichot et al. |
| 4,533,807 | 8/1985 | Minamida . |
| 4,544,818 | 10/1985 | Minamida . |
| 4,614,852 | 9/1986 | Matsushita et al. |
| 4,968,550 | 11/1990 | Socha . |
| 4,996,115 | 2/1991 | Eerkes et al. |
| 5,106,433 | 4/1992 | Nakamura et al. |
| 5,345,667 | 9/1994 | Coppier ........................ 29/505 |
| 5,430,928 | 7/1995 | Flammang ..................... 29/505 |

FOREIGN PATENT DOCUMENTS

| 923673 | 7/1947 | France . |
| 1404629 | 5/1965 | France . |
| 2302174 | 9/1976 | France . |
| 715630 | 1/1942 | Germany . |
| 52-83868 | 6/1977 | Japan . |
| 58-65121 | 4/1983 | Japan . |
| 2-34436 | 8/1984 | Japan . |
| 59-179247 | 10/1984 | Japan . |
| 60-24090 | 2/1985 | Japan . |
| 62-26905 | 6/1987 | Japan . |
| 7907994 | 6/1981 | Netherlands . |
| 82 3396 | 10/1982 | Norway . |
| 218334 | 3/1942 | Switzerland . |
| 227769 | 10/1943 | Switzerland . |
| 1515951 | of 1978 | United Kingdom . |

OTHER PUBLICATIONS

Japanese Official Action, Notice of Reasons for Rejection, mailing date Mar. 28, 1995, Appln. No. 4-68980.

*Primary Examiner*—David P. Bryant
*Attorney, Agent, or Firm*—Young & Thompson

[57] ABSTRACT

The article is constituted from a plate produced from a relatively soft first metal (1). It has, on one of its faces, a metallic element (2) in the form of a perforated sheet or a grid produced from a second metal or alloy harder than that of the plate (1). The metallic element (2) is fixed to the plate by drop-forging or stamping in order to embed it, at least partially, in this plate. The article is especially useful as a cooking vessel.

12 Claims, 7 Drawing Sheets

METHOD FOR MAKING A COOKING VESSEL

This application is a division of application Ser. No. 08/389,803, filed Feb. 16, 1995, now U.S. Pat. No. 5,506,062, which is a continuation of application Ser. No. 08/073,657, filed Jun. 8, 1993, abandoned, which is a continuation of application Ser. No. 07/855,887, filed Mar. 23, 1992, abandoned.

FIELD OF THE INVENTION

The present invention relates to an article constituted from a plate produced from a relatively soft metal.

The subject of the invention is also the cooking vessels constituting this article.

BACKGROUND OF THE INVENTION

Aluminum is a metal which has numerous advantages. It is light, can easily be deep-drawn or drop-forged, and conducts heat well. In addition, it is relatively economical. Because of these qualities, it is universally used in industry, especially for producing cooking vessels.

However, it does have drawbacks. First of all, it is relatively soft, so that its surface scratches easily. In domestic applications, aluminum is often coated with a non-stick layer such as polytetrafluoroethylene or with a layer of enamel. However, the lifetime of these coatings is limited because the aluminum is too soft a support.

Moreover, aluminum articles, and in particular cooking vessels, have a tendency to deform easily due to the effect of heat generated, for example, by an electrical hotplate or a gas burner.

In order to overcome this difficulty, it is possible either to increase the thickness of the metal or to apply a stainless steel sheet to the aluminum wall, for example by hot stamping. However, in this case, the manufacturing cost is substantially increased and the thermal conductivity is reduced, which increases the cooking times.

Moreover, aluminum utensils cannot be heated inductively, as this heating method requires the use of vessels made from magnetic metal such as ferritic stainless steel.

SUMMARY OF THE INVENTION

The object of the present invention is to modify, in an economical manner, the characteristics of the surface of a metal in order to improve its properties or in order to render this metal capable of being used in specific applications.

The article according to the invention, constituted from a plate produced from a relatively soft first metal, is characterized in that it has, on one of its faces, a metallic element in the form of a perforated sheet or a grid produced from a second metal or alloy harder than that of the plate, the metallic element being fixed to the plate by cold stamping or drop-forging in order to embed it, at least partially, in this plate.

By drop-forging is meant an operation which consists in striking, for example with a drop hammer, or in pressing strongly, for example by means of a surface or of a roll, onto the grid in order to embed it, at least partially, in the surface of the metal.

By grid is meant not only a metallic frame composed of intersecting wires but also a perforated sheet having circular, square or otherwise shaped holes.

A composite surface is thus obtained having properties resulting from those of the two metals, that is to say of the base metal and of that forming the grid. In other words, the properties of the base metal have been modified by the grid which is intimately bound to this base metal.

For example, if the grid is made from a metal harder than that of the base metal, the presence of the grid will have the effect of hardening the surface of the base metal.

Moreover, the use of a hard metal grid in association with a soft base metal is well suited for the production of the article according to the invention as, during the drop-forging, the hard grid, which has a small contact surface, penetrates deeply into the soft base metal, which ensures an excellent binding between this grid and the base metal.

Furthermore, if the base metal tends to deform due to the effect of heat, the presence of the grid (if the latter is made from metal which expands less on heating) will render this metal distinctly less deformable.

In another application, if the base metal is not magnetic (in the case of aluminum, for example), the presence of a magnetic metal grid anchored at the surface of the metal will render the latter capable of being heated inductively.

In all cases, the provision of a grid-shaped second metal, on a given base metal, does not greatly affect the cost and enables the properties of the base metal to remain intact.

According to another version of the invention, the article has, on each of its two faces, a metallic element corresponding to the above-mentioned definition.

According to a different version of the invention, the article is such that the surface of the element or elements, which surface is on the opposite side from the plate, is covered by a coating made from metal identical to the first metal.

According to yet another different version of the invention, each surface of the plate to which an element is fixed is covered by a continuous enamel or fluorocarbon-resin layer.

According to a further version of the invention, the article comprises at least two metallic plates fixed one against the other and provided at their interface with a metallic element which is partly embedded in the metal of one of the plates and in the metal of the other plate.

The invention thus enables the aluminum bottoms of cooking vessels to be reinforced, the lifetime of their non-stick coating to be increased and enables them to be rendered capable of being heated inductively, if the added grid is made from magnetic metal, such as ferritic stainless steel.

Other particular features and advantages of the invention will further emerge from the description hereinbelow.

BRIEF DESCRIPTION OF THE DRAWINGS

In the attached drawings, given by way of non-limiting examples.

DETAILED DESCRIPTION OF THE INVENTION

Figure 1:
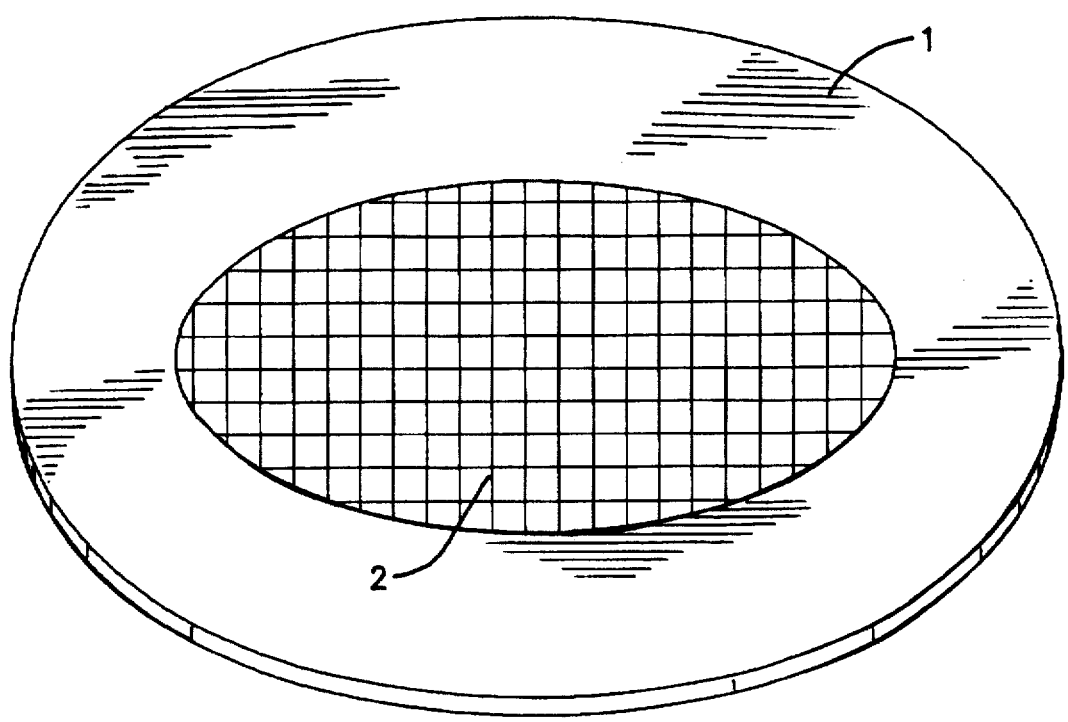
FIG. 1 is a perspective view of a metallic disc to which is applied a grid of a metal different from that of the disc.
Figure 2:
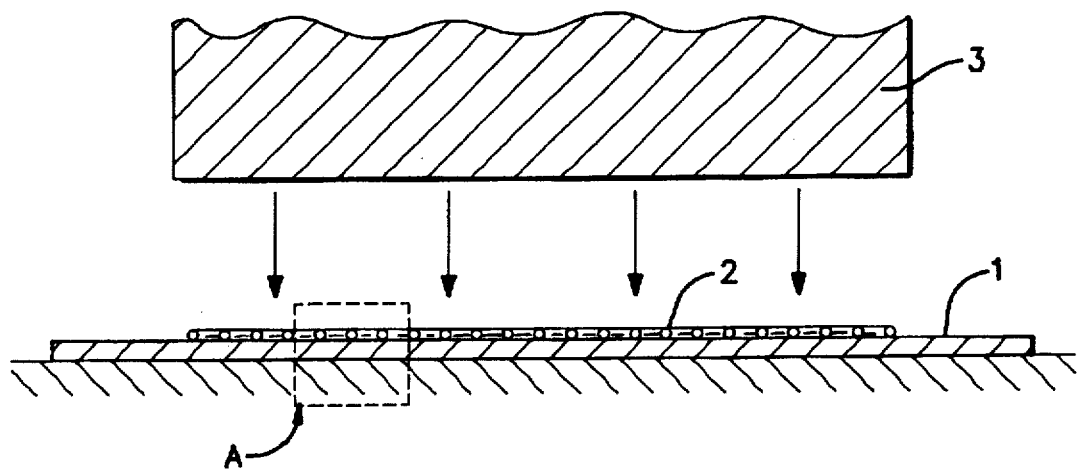
FIG. 2 is a sectional view showing diagrammatically the process for drop-forging the grill on the disc.

The article constituted from a plate produced from a relatively soft first metal is characterized in that there is applied (see FIGS. 1 and 2) to the surface 1 of the said metal, in the form of a disc, a grid 2 of another metal, and in that this grid 2 is fixed to the said surface 1 by drop-forging in order to embed it, at least partially, in this surface.

The grid 2 is preferably made from a harder metal than that of the surface 1.

Figure 3:
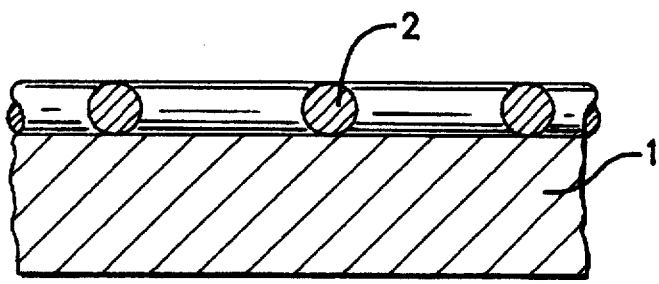
FIG. 3 is a view on a larger scale of the detail A of FIG. 2.

FIG. 3 shows, on a large scale, the initial stage of applying the grid 2 to the disc 1.

Figure 4:
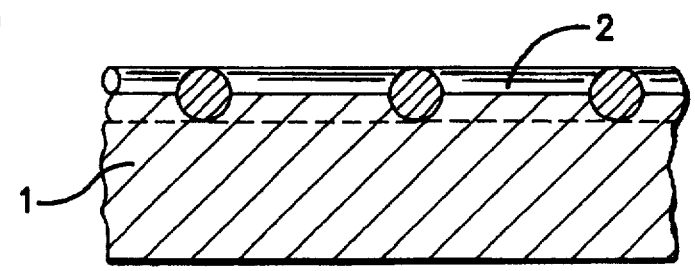
FIG. 4 is a view similar to FIG. 3, showing the grid embedded in the metal of the disc, after drop-forging.
Figure 5:
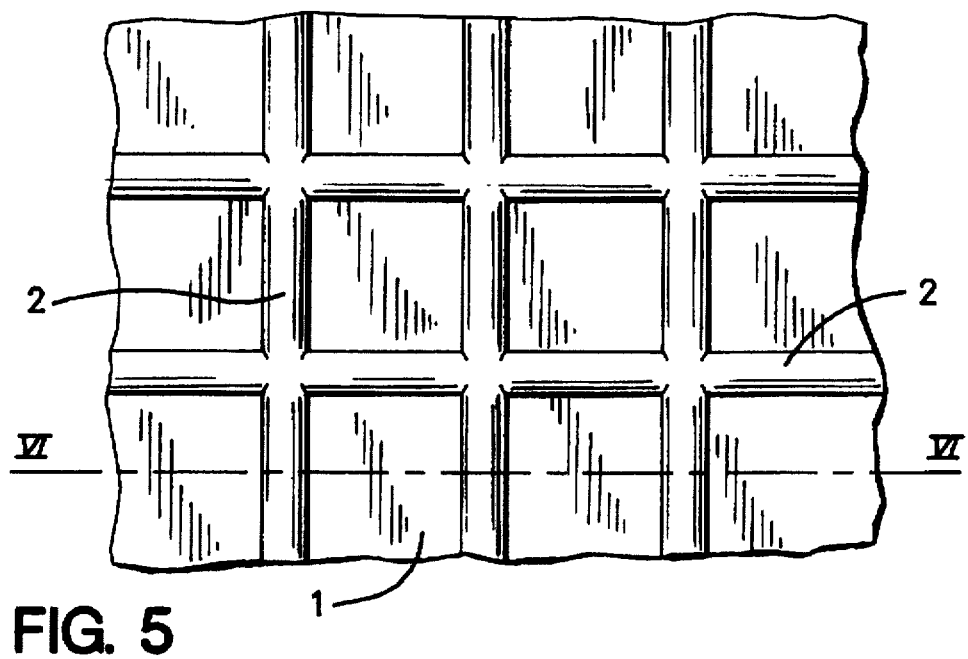
FIG. 5 is a partial plan view, on a larger scale, showing the grid fixed on the surface of the metal.

Due to the effect of the force applied by the hammer 3 (see FIG. 2) on the grid 2, the latter is driven into the metal of the disc 1, as indicated in FIG. 4.

The depth of penetration depends on the force applying the grid 2 to the disc 1, on the relative hardnesses of the metals of the grid 2 and of the disc 1 and on the diameter of the wire with which the grid 2 has been produced.

In the case of FIG. 4, the grid 2 is driven into the metal of the disc 1 over a depth which corresponds substantially to half the diameter of the wire of the grid 2.

Figure 6:
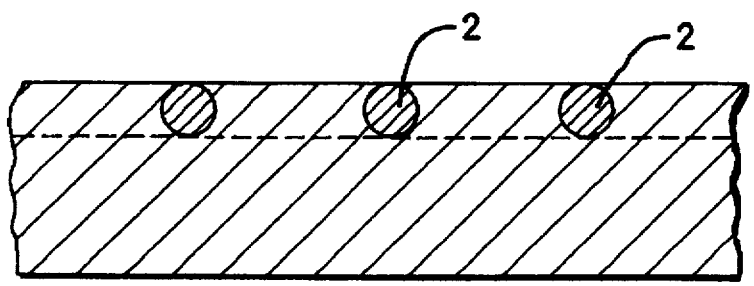
FIG. 6 is a sectional view in the plane VI—VI of FIG. 5.

Employing a greater drop-forging force, it is possible to embed the grid 2 entirely in the disc 1, as indicated in FIG. 6.

The preferred metal of the relatively soft metal disc 1 is aluminum.

However, the metal may also be copper, tin, lead or an alloy of one or more of these metals, or any other metal or alloy.

The grid 2 may be made from ferrous metal or steel having magnetic properties.

In this case, not only does the grid 2 embedded in the surface of the disc 1 reinforce and harden the latter, but it furthermore renders the latter capable of being heated inductively.

This grid 2 may thus be made from stainless steel.

In the case of an aluminum disc 1 and a stainless steel grid 2 composed of wire of diameter lying between several tenths of a mm and one mm, the force employed during the drop-forging must be at least equal to approximately 10 tonnes per $cm^2$.

The grid 2 may have any kind of meshes, square, rectangular, hexagonal or other shapes.

Instead of being produced by wires, the grid 2 may be constituted by a cut-out metal sheet or in the form of expanded metal.

Figure 7:
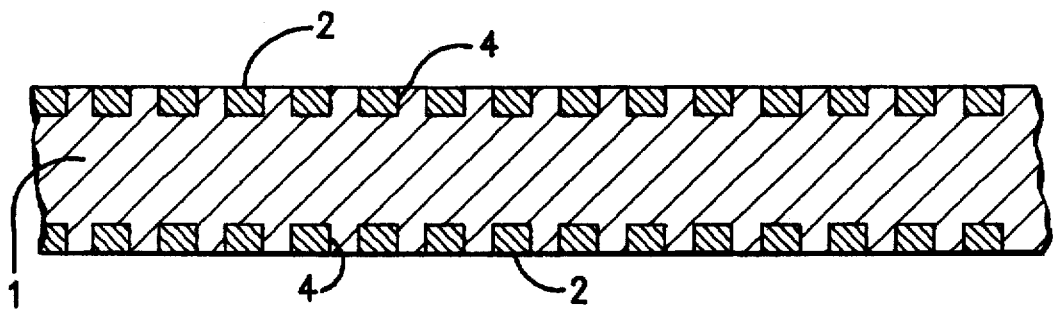
FIG. 7 is a sectional view of a plate comprising, on its two faces, a perforated sheet embedded in the metal of the plate.

In the embodiment of FIG. 7, the metallic plate 1 comprises, on its two faces, a metallic element 2 in the form of a sheet provided with openings 4. These two elements 2 are completely embedded by drop-forging in the metal of the plate 1. Indeed, the metal of the plate 1 completely fills the openings 4 of the sheets 2.

Of course, the thickness of the sheets 2 is small in relation to that of the plate 1. The drop-forging operation involves the application on the sheet 2-plate 1-sheet 2 sandwich a pressure sufficient for the two sheets 2 to be able to penetrate into the metal of the plate 1 and for the metal of the latter to be able to flow into the openings 4 of the sheets.

The two metallic elements or sheets 2 may be produced in identical metals or alloys. The plate 1 may, for example, be made from a soft metal such as aluminum or copper and the sheets made from harder metal such as steel.

In this case, a composite plate is obtained having two faces which are hard and resistant to abrasion and mechanical shock. In addition, the composite plate has a distinctly improved resistance to deformation due to mechanical or thermal stresses, whilst keeping the essential properties of aluminum (lightness and good thermal conductivity) or of copper (good thermal conductivity).

However, the two metallic elements or sheets 2 may be produced in different metals or alloys.

In this case the composite plate will have faces having different mechanical or thermal properties, which may be advantageous in certain applications. In this case too, the composite plate will keep, for the most part, the advantages provided by the base metal of the plate.

Figure 8:
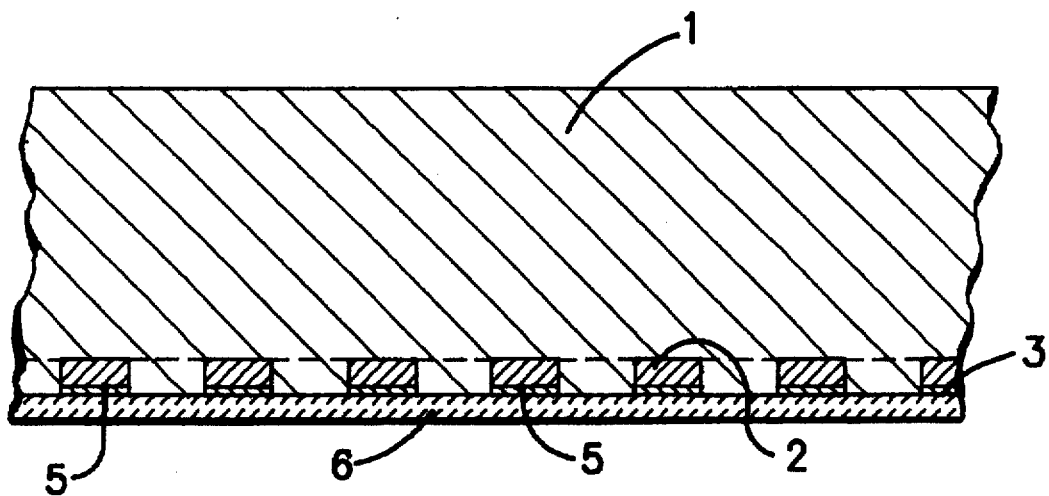
FIG. 8 is a sectional view of the wall of an article in which the surface of the said sheet or grid, which surface is on the opposite side from the plate, is covered by a coating made from metal identical to the said first metal.

In the embodiment of FIG. 8, there is shown, in partial cross-section, the wall of an article such as a cooking vessel comprising a plate 1 produced from a first metal to which is fixed, by cold stamping or drop-forging, an open-work sheet 2 or grid produced from a second metal different from the first metal.

In accordance with the present invention, the surface of the said open-work sheet 2, which surface is on the opposite side from the plate 1 is covered by a coating 5 made from metal identical to the said first metal.

Thus, in the case of a cooking vessel, the plate 1 is made from aluminum and the open-work sheet 2 is made from steel sheeting covered with an aluminum layer 5. As a result, the surface of the plate 1, to which the open-work sheet 2 is fixed, and that of this sheet 2 may be covered by a continuous enamel layer 6 as indicated in FIG. 8.

In the example of FIG. 8, the surface of the plate 1 and the surface of the open-work sheet 2, which are covered by the enamel layer 6, are located in alignment with each other.

Thus, the enamel layer 6 totally masks the open-work steel sheet 2. By virtue of the aluminum layer 5 which covers the surface of the sheet 2, the enamel 6 adheres both to this sheet and to the aluminum of the plate 1.

Moreover, this enamel layer 6 protects the steel sheet especially as regards to rusting, and makes it easier for the surface of the aluminum to be cleaned.

The open-work steel sheet 2 may be adjacent to the outer or inner surface of the bottom of a cooking vessel.

By virtue of the presence of this open-work sheet made from steel or other ferrous metal, the cooking vessel may be used on an induction plate, whilst having all the advantages specific to aluminum vessels.

Figure 9:
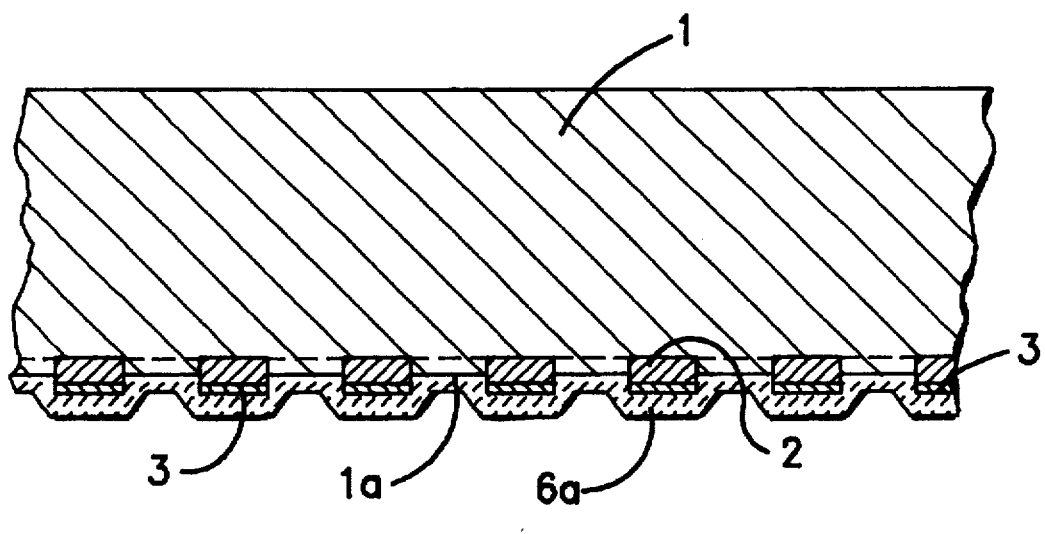
FIG. 9 is a view similar to FIG. 8 of a variant embodiment of the invention according to the said FIG. 8.

In the case of the example shown in FIG. 9, the surface of the steel open-work sheet 2 projects relative to the surface 1a of the aluminum plate 1.

In this case, the enamel coating 6a has, in line with the projecting portions of the open-work sheet 2, raised features separated by hollows.

The raised features of the enamel layer 6a enable the wear of the enamel layer to be localised in discrete zones such that the hollow portions of the enamel preserve their original shine.

The enamel layer 6a may of course be replaced by a layer of fluorocarbon resin such as polytetrafluoroethylene (PTFE).

The attachment of the PTFE to the aluminum is produced by virtue of a prior acid etch which has the effect of creating attachment cavities on the aluminum surface.

Because the open-work sheet 2 is covered with an aluminum layer, these attachment cavities are also created on the open-work sheet 2, which enables the PTFE coating to adhere both to the aluminum of the plate 1 and to the open-work sheet 2.

Figure 10:
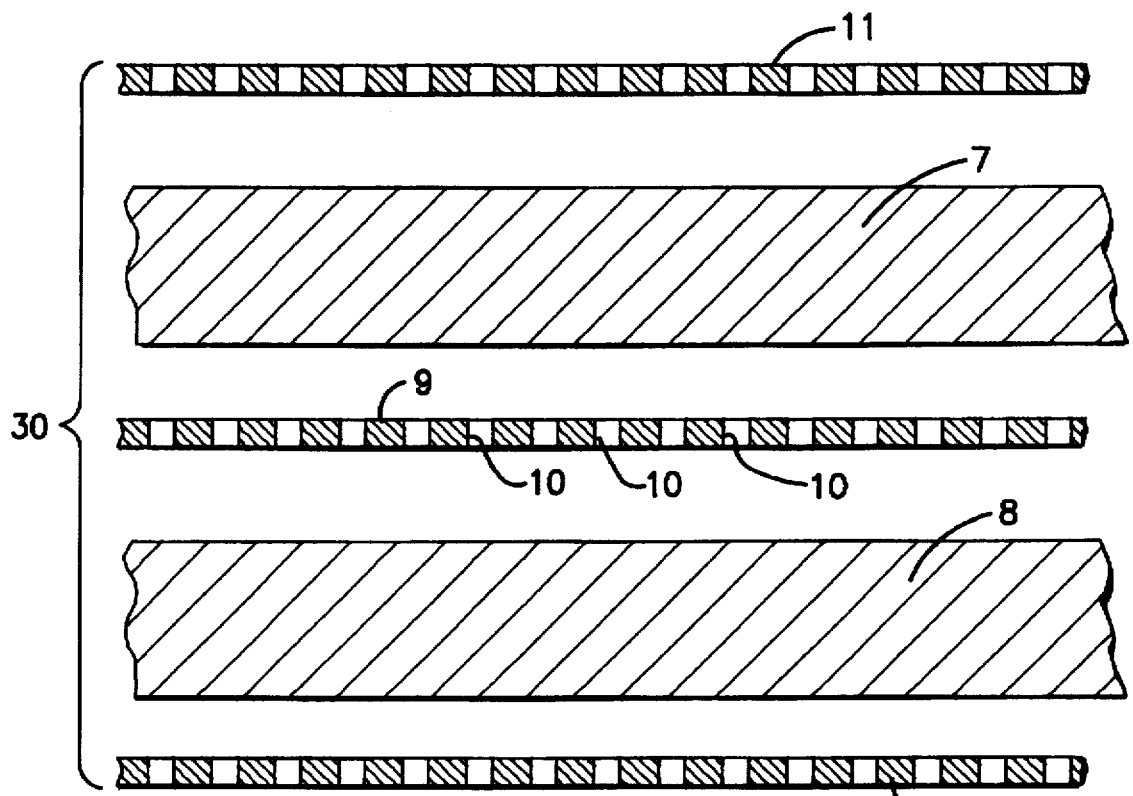
FIG. 10 is a sectional view showing two plates and three perforated sheets before their assembly by drop-forging.
Figure 11:
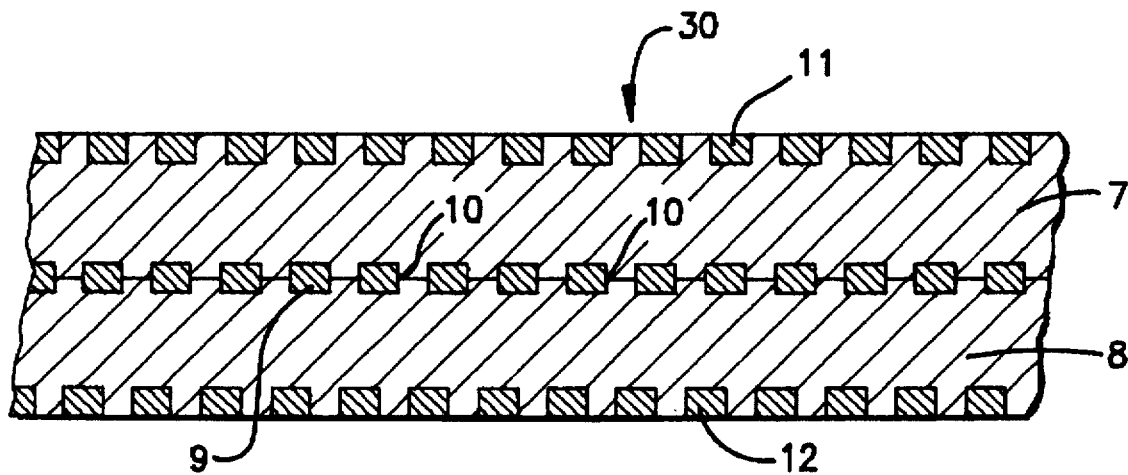
FIG. 11 is a sectional view of the composite plate thus obtained after drop-forging.

In the case of the embodiment according to FIGS. 10 and 11, the composite plate 30 comprises two metallic plates 7, 8 fixed one against the other and provided at their interface with a metallic element or sheet 9 having openings 10 which is partly embedded in the metal of one 7 of the plates and in the metal of the other plate 8.

The two metallic plates 7, 8 may be produced in identical or different metals or alloys.

The flowing of the metal of the two plates 7, 8 into the openings 10 of the metallic sheet 9 enables an excellent binding between the two plates 7, 8 to be obtained.

In the example of FIGS. 10 and 11, the two metallic plates 7, 8 carry, on their outer face, a metallic element 11, 12 corresponding to the above-mentioned definition.

In this example, the composite plate 30 produced from two plates 7, 8, for example made from aluminum, is reinforced by three layers 9, 11, 12 of a metal having a greater hardness and mechanical strength than aluminum, which thus enable the mechanical properties of the plate to be considerably enhanced.

In addition, the presence of the perforated sheets 9, 11, 12 has, because of their smaller thickness, very little effect on the density which thus remains close to that of aluminum.

Of course, the perforated sheet 9 may be of a different type from that of the other two sheets 11, 12, depending on the desired properties.

Figure 12:
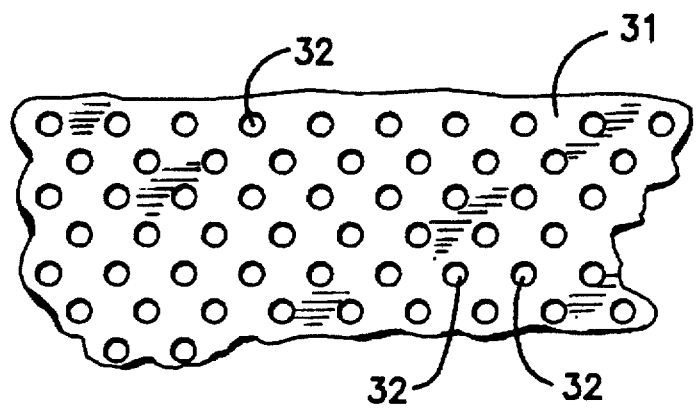
FIG. 12 is a partial plan view of a perforated sheet.

Metallic elements 9, 11 and 12 may take the form of perforated sheet 31 having openings 32 as shown in FIG. 12.

Figure 13:
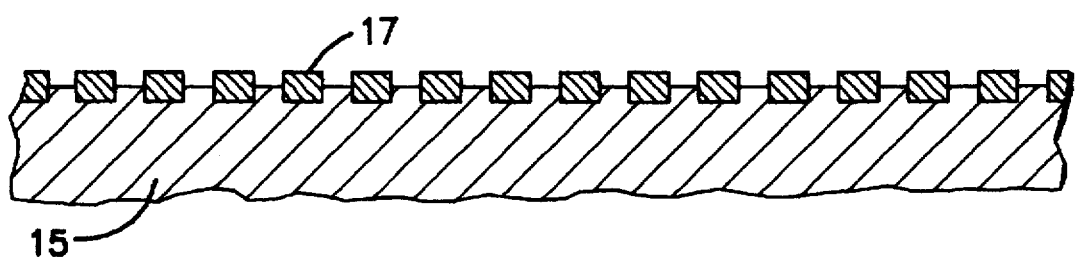
FIG. 13 is a partial sectional view of a plate carrying a perforated sheet partially embedded in this plate.

FIG. 13 represents a preliminary step in assembling composite plate 13.

Figure 14:
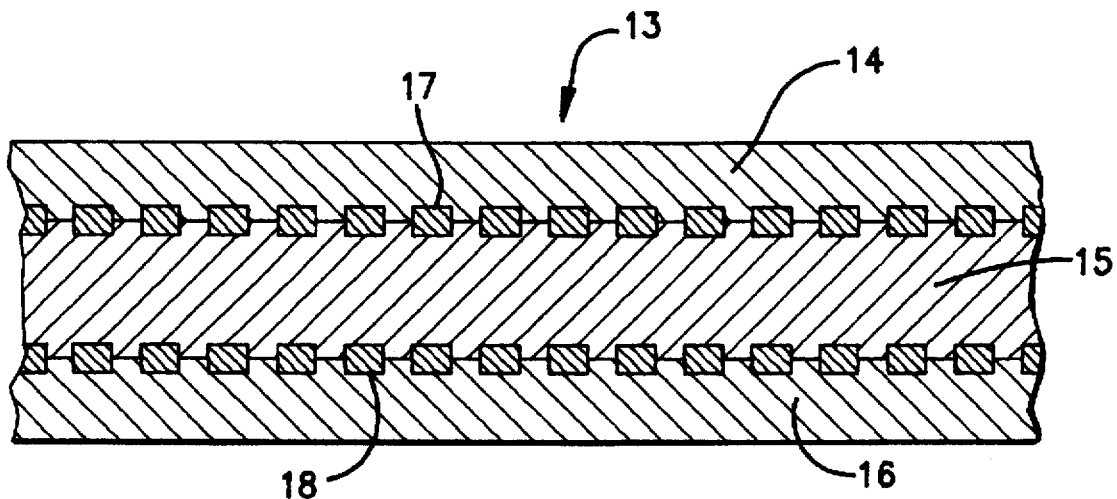
FIG. 14 is a sectional view of a composite plate in which two perforated sheets are embedded.

In the embodiment of FIG. 14, the composite plate 13 comprises three metallic plates 14, 15, 16 fixed one against the other and provided at each of their interfaces with a metallic element or sheet 17, 18 corresponding to the above-mentioned definition.

In this embodiment, the perforated metallic sheets 17, 18 have the following two functions:

first of all they enable the binding between the plate 15 and the plates 14, 16 to be ensured, by virtue of the flowing of metal of the plates into the openings of the sheets 17, 18;

moreover, these sheets 17, 18 enable the composite plate 13 to be reinforced or strengthened in order to give the latter better resistance to mechanical stresses.

The three plates 14, 15, 16 may be produced from the same metal, such as aluminum. However, they may be made from different metals, depending on the anticipated applications. Thus, the two outer plates 14, 16 could be made from copper and the inner plate 15 made from aluminum.

Thus, the inner plate 15 is jacketed externally by two copper layers enabling the thermal conductivity to be improved.

Figure 15:
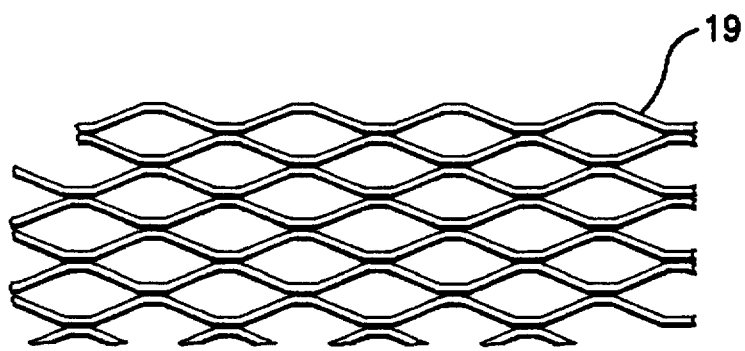
FIG. 15 is a partial plan view of a metallic element in the form of an expanded sheet.

FIG. 15 shows a sheet 19 made from expanded metal which may replace the perforated sheets described hereinabove.

Of course, the composite plates that have just been described may be used directly in various industrial applications or serve as a basis for the production, by deep-drawing, of various articles and, in particular, of cooking vessels whose bottoms have greater resistance to abrasion or to deformations due to thermal or mechanical stresses.

Figure 16:
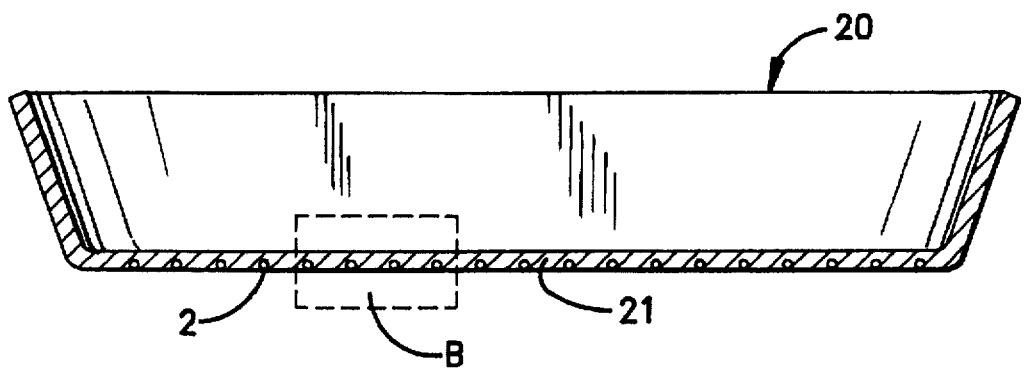
FIG. 16 is a sectional view of a cooking vessel carrying a grid on the outer face of its bottom.

FIG. 16 shows a cooking vessel, such as a frying pan, saucepan or cake mould produced from an aluminum sheet of thickness lying between 1 and 3 mm.

Figure 17:
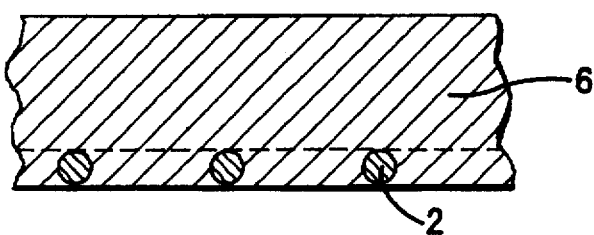
FIG. 17 is a view on a larger scale of the detail B of FIG. 16.

On the outer face of the bottom 21 of the vessel 20 has been embedded, by drop-forging, a ferritic stainless steel grid 2 which is driven right into the metal, as indicated in FIG. 17.

The grid 2 embedded in the bottom of the vessel 20 confers on the latter the following technical advantages:

a) hardening of the bottom of the vessel, which enables the latter to resist wear better, b) improvement to the resistance of the bottom to deformations generated by temperature variations; because of this, the bottom remains plane and the heat transfer with a hotplate remains optimal, c) the vessel may be heated inductively, by virtue of the presence of the magnetic stainless steel, d) because the aluminum is an excellent heat conductor, the heat stored by the stainless steel of the grid is transferred quickly and uniformly across the aluminum bottom 21, e) because the stainless steel grid is discontinuous, it is possible to adjust the heat transfer across the bottom of the vessel to a reduced value and, consequently, to avoid abrupt and excessive heating of the food, f) the presence of the grid only slightly affects the manufacturing cost and in no way impedes the deep-drawing of the aluminum vessels.

As a consequence, the above-mentioned cooking vessel has all the advantages due to the use of aluminum whilst also having the advantages provided by the stainless steel grid.

If the possibility of inductively heating is not desired, the grid may be made from ordinary steel or any other metal harder than aluminum.

Figure 18:
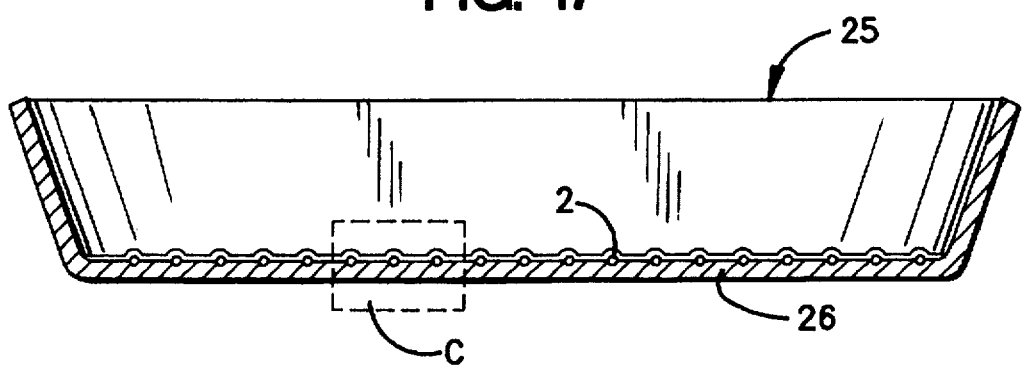
FIG. 18 is a sectional view of a cooking vessel carrying a grid on the inner face of its bottom.

In FIG. 18 is shown another aluminum cooking vessel 25, the bottom 26 of which has, on its inner face, a grid 2, for example made from stainless steel or another relatively hard steel.

Figure 19:
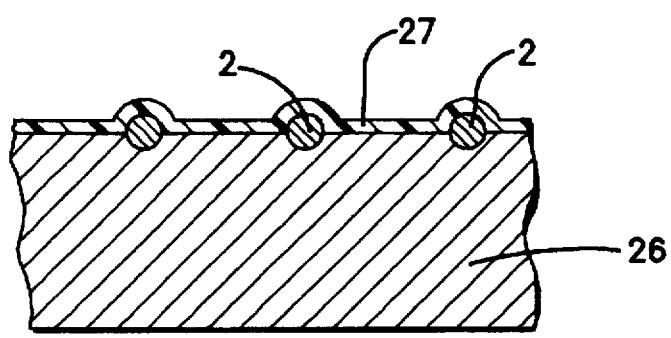
FIG. 19 is a view on a larger scale of the detail C of FIG. 18.

It is seen from FIG. 19 that this grid 2 is only partially embedded in the metal of the bottom 26 so that it projects from the inner surface of this bottom 26.

In this example, a non-stick coating 27, for example made from polytetrafluoroethylene, covers the inner surface of the bottom 26 and the grid 2. Because the latter projects in relation to the surface, the coating 27 forms a raised feature in line with the wires of the grid.

The technical advantages provided by this embodiment are the following:

The presence of the grid 2 projecting from the surface of the bottom 26 of the vessel hardens this surface which enables the non-stick coating better to resist the action of sharp implements.

In fact, the sharp implement does not reach the soft aluminum surface, as the stainless steel grid projects from the latter. As a consequence, the sharp implement only affects the projecting portions of the grid, so that only the portion of the coating which covers the grid suffers some damage. This damage however will remain virtually invisible since it will be localised in very small zones.

Moreover, the fact that, by virtue of the grid 2, the non-stick coating forms a uniformly raised feature on the inner surface of the vessel, enables the contact surface of the food with the surface of the vessel to be limited, which limits even further the attachment of this food to this surface.

In order for the above-mentioned advantages to be fully realized, the distance between two neighbouring wires of the grid should not preferably not exceed several mm.

The invention is applicable to fields other than the manufacture of cooking utensils. In fact, it may be applied to any technical field where it is desired to modify the properties of the surface of any metal by embedding in the latter a grid made from another metal.

This grid may be constituted by welded or woven wires in such a manner as to form meshes of any shape. Moreover, the wires of the grid instead of being of circular cross-section may be of square or other cross-section.

Likewise, in the embodiments shown, the grid composed of circular cross-section wires may be replaced by a sheet, for example made from aluminum perforated with circular holes, for example of diameter equal to 0.75 mm separated by approximately 1.5 mm.

Of course, the invention is not limited to the exemplary embodiments which have just been described, and it is possible to bring to the latter numerous modifications without straying from the scope of the invention.

In particular, the various embodiments of the articles which have just been described may form the subject of multiple combinations between them or with other processes appearing in the prior art so as to further improve the characteristics of the articles and especially of the cooking vessels thus obtained, without straying from the field of the invention.

It will be possible, inter alia, to use metallic elements, sheets or grids, of very varied shapes, and to embed by cold or hot stamping or by rolling one of the elements on the surface of one of these plates or between at least two metallic plates so that it constitutes their interface(s). By interposing metallic elements between the plates, composite plates are thus formed comprising a variable number of layers.

On at least one of the faces of a single or composite plate, it is possible to embed a grid or a sheet provided, or not, on its outer face with a coating made from metal identical to the metal constituting the surface of the plate, and then optionally applying to this face an enamel or fluorocarbon-resin coating.

I claim:

1. Method for producing a cooking vessel having a bottom and a side wall, comprising the following steps:
   a) applying on a first plate produced from a relatively soft first metal and having a substantially uniplanar outer surface, a first metallic element in a form of a perforated sheet or a grid produced from a second metal or alloy harder than that of said first plate, a surface of said first metallic element defining a bottom portion of said cooking vessel;
   b) fixing said first metallic element on said first plate by drop-forging or stamping in order to embed it, at least partially, in said first plate, whereby portions of said substantially uniplanar outer surface of said first plate form an interface between said first plate and embedded portions of said first metallic element; and
   c) deep-drawing the assembly constituted from said first plate and said first metallic element fixed to it in order to produce said cooking vessel.

2. Method according to claim 1, wherein in the deep-drawing step c), said first metallic element is fixed to an outer surface of the bottom of said cooking vessel (20).

3. Method according to claim 1, wherein in the deep-drawing step c), said first metallic element is fixed to an inner surface of said cooking vessel.

4. Method according to claim 1, further comprising covering the surface of said first metallic element, said surface being on the opposite side from the plate, with a coating made from metal identical to the first metal.

5. Method according to claim 4, further comprising covering said surface of said first metallic element, and the surface of said plate into which the first metallic element is at least partially embedded, with a continuous enamel or fluorocarbon-resin layer.

6. Method according to claim 1, further comprising, in the applying step a), after applying said first metallic element on said first plate, further applying, on said first metallic element, a second plate produced from a relatively soft metal, and then, in the fixing step b), after fixing said first metallic element on said first plate, fixing a second metallic element by drop-forging or stamping in order to partly embed it in said second plate and to partly embed said first element in said second plate.

7. Method according to claim 6, further comprising in the applying step a), after applying said second metallic element, further applying on an opposite surface of the first plate, a third metallic element in a form of a perforated sheet or a grid produced from a metal or alloy harder than that of said first plate.

8. Method for producing a cooking vessel having a bottom and a side wall, comprising the following steps:
   a) superposing a first metallic element, a first plate produced from a relatively soft first metal and having a substantially uniplanar outer surface, and a second metallic element, said first and second metallic elements being in a form of a perforated sheet or a grid produced from a second metal or alloy harder than that of said first plate and having their surfaces defining a bottom portion of the cooking vessel;
   b) fixing said first and second metallic elements to said first plate by drop-forging or stamping in order to embed them, at least partially, in said first plate, whereby portions of said substantially uniplanar outer surface of said first plate form an interface between said first plate and embedded portions of said first metallic element; and
   c) deep-drawing the assembly constituted from said first plate and said first and second metallic elements fixed to it in order to produce said cooking vessel.

9. Method according to claim 1, further comprising covering the surface of said metallic element, said surface being on the opposite side from said first plate, with a coating made from metal identical to the first metal.

10. Method according to claim 9, further comprising covering said surface of said first metallic element, and the surface of said first plate into which the first metallic element is at least partially embedded, with a continuous enamel or fluoro carbon-resin layer.

11. Method according to claim 8, further comprising, in the superposing step a), after superposing said first metallic element, said first plate, and said second metallic element further applying, on said second metallic element, a second plate produced from a relatively soft metal, and then, in the fixing step b), after fixing said first and second metallic elements to said first plate, fixing said second metallic element by drop-forging or stamping in order to partly embed it in said second plate and to partly embed it in said first plate.

12. Method according to claim 11, further comprising in the superposing step a), after applying said second plate on said second metallic element, further applying on an opposite surface of said second plate, a third metallic element in a form of a perforated sheet or a grid produced from a metal or alloy harder than that of said second plate.

* * * * *